United States Patent [19]

Tuszynski

[11] Patent Number: 4,725,571

[45] Date of Patent: Feb. 16, 1988

[54] PRESULFIDING COMPOSITION FOR PREPARING HYDROTREATING CATALYST ACTIVITY AND PROCESS FOR PRESULFIDING A HYDROTREATING CATALYST

[76] Inventor: William J. Tuszynski, 3 Evelyn La., Quakertown, Pa. 18951

[21] Appl. No.: 6,398

[22] Filed: Jan. 23, 1987

[51] Int. Cl.$^4$ .................. B01J 27/049; B01J 27/051; C09K 3/00
[52] U.S. Cl. ..................................... 502/220; 252/182
[58] Field of Search ................. 502/216, 220; 252/182

[56] References Cited

U.S. PATENT DOCUMENTS 4,443,330 4/1984 Nongbri ........................ 502/216 X
4,530,917 7/1985 Berrebi ................................. 502/220

Primary Examiner—W. J. Shine

[57] ABSTRACT

A presulfiding agent which is a blend of an alkyl sulfide of the formula $R_1S_xR_2$ where $R_1$ and $R_2$ are alkyl groups having from 1 to 12 carbon atoms and x is 1 or 2 and an alkyl polysulfide of the formula $R_3S_yR_4$ wherein $R_3$ and $R_4$ are alkyl groups having from 1 to 20 carbon atoms and y is 2 to 8 provided that the total carbon atoms in $R_3$ and $R_4$ do not exceed 30 and y is greater than x, is disclosed herein along with a process employing said agent for sulfiding an oxidic hydrotreating catalyst to form a sulfided hydrotreating agent and a process of hydrotreating a petroleum fraction with such sulfided hydrotreating catalyst.

19 Claims, No Drawings

PRESULFIDING COMPOSITION FOR PREPARING HYDROTREATING CATALYST ACTIVITY AND PROCESS FOR PRESULFIDING A HYDROTREATING CATALYST

BACKGROUND OF THE INVENTION

Hydrotreating is an essential step in the refining of crude petroleum, the major purposes of which is for (i) the conversion of organosulfur and organonitrogen compounds to hydrogen sulfide and ammonia, respectively, (ii) the removal of metals and (iii) the hydrogenation of olefins and aromatics present in the petroleum fraction. Catalysts for the hydrotreating process are metal oxides which have been sulfided prior to use (presulfided). By presulfiding under carefully controlled conditions, coke formation, which leads to catalyst deactivation by plugging the catalyst pores, is minimized.

In copending patent application Ser. No. 675,165 filed Nov. 27, 1984, a presulfiding agent, process of presulfiding an oxide hydrotreating catalyst and the process of hydrotreating petroleum is disclosed. The presulfiding agent is a dialkyl polysulfide of the formula: $R(S)_xR^1$ wherein R and $R^1$ are $C_1$–$C_{20}$ alkyl groups and x an average number is in the range of 2 to 8. The process of presulfiding the oxidie hydrotreating catalyst requires that no reducing agent be introduced into the presulfiding procedure.

PRIOR ART

Pretreatment of an oxidie hydrotreating catalyst is well known in the art of petroleum refining. U.S. Pat. No. 4,443,330 discloses the upgrading of a coal liquid by feeding said liquid along with hydrogen and a sulfur-containing liquid to a catalytic reactor. The catalyst in the reactor is a metal oxide which is converted to the sulfided state by sulfur or hydrogen sulfide in the reactor. The catalyst is kept in a highly sulfided state by the reaction with the sulfur-containing liquid passed through the reactor. The sulfur-containing liquid may be a high boiling hydrocarbon sulfur compound of the formula $RSR_1$ where R and $R_1$ are alkyl groups having from 2 to 20 carbon atoms (methyl disulfide, dodecyl disulfide and diphenyl disulfide are also mentioned).

U.S. Pat. No. 4,530,917 discloses the presulfiding (ex situ) in the absence of hydrogen of a metal oxide hydrotreating catalyst by means of a sulfurization agent having the formula: $R-S_n-R_1$ wherein n is 3 to 20 and R and $R_1$ are each an organic radical which may be a $C_1$–$C_{150}$ alkyl. The sulfurization agent may be diluted with a solvent therefor.

STATEMENT OF INVENTION

This invention is a presulfiding agent comprising a blend of from at least 10 to about 90 weight percent dialkyl sulfide of the formula $R_1S_xR_2$ wherein $R_1$ and $R_2$ are independently alkyl groups having from 1 to 12 carbon atoms and x is 1 or 2, and from no more than 90 to about 10 weight percent of a dialkyl polysulfide of the formula $R_3S_yR_4$ wherein $R_3$ and $R_4$ are independently alkyl groups having from 1 to 20 carbon atoms and y, the sulfur rank of the polysulfide (average number of sulfur atoms per molecule), is 2 to 8 provided that the total number of carbon atoms in $R_3$ and $R_4$ do not exceed 30 and y is greater than x.

This invention is also a process of presulfiding an oxidie hydrotreating catalyst to form a sulfided hydrotreating catalyst which comprises passing at an elevated temperature and pressure a presulfiding solution and hydrogen gas in contact with an inert, solid, porous catalyst support bearing molybdenum oxide in an amount ranging from about 5 to about 50 percent, based on the combined weight of the support and oxide, and cobalt oxide in an amount ranging from 0 to 20 percent, based on the combined weight of the support and oxides, said presulfiding solution comprising a liquid hydrocarbon solvent containing the presulfiding agent as defined above in an amount sufficient to provide a total sulfur content of from about 0.5 to about 5 percent based on the weight of said solution, said contact with said support continuing for a time sufficient to materially presulfide said metal oxides.

This invention is also the sulfided hydrotreating catalyst prepared in accordance with the above described process.

Finally, this invention is also a process of refining crude hydrocarbon feedstock which comprises contacting said feedstock with a sulfided hydrotreating catalyst prepared in accordance with the above described process and hydrogen at elevated temperature and pressure.

DETAILED DESCRIPTION OF THE INVENTION

The invention is an improved presulfiding agent for sulfiding oxidic hydrotreating catalysts, said presulfiding agent being a blend of a dialkyl sulfide or dialkyl disulfide with one or more polysulfides, said presulfiding agent affording a catalyst composition of surprisingly high activity when used to presulfide an oxidic hydrotreating catalyst by contacting a solution of said presulfiding agent in a hydrocarbon carrier with said oxidic hydrotreating catalyst in the presence of hydrogen at elevated temperatures and pressures.

The invention is also a process for the use of such presulfided catalyst composition to refine petroleum or another hydrocarbon feedstock by contacting said catalyst composition with said feedstock in the pressure of hydrogen at elevated temperature and pressure.

A preferred presulfiding agent for this invention is a blend of 25 to 75 weight percent of a dialkyl sulfide or a dialkyl disulfide wherein the alkyl group or groups have from 1 to 6 carbon atoms and from 75 to 25 weight percent of a dialkyl disulfide or polysulfide wherein the alkyl groups have from 1 to 9 carbon atoms. Typically, the alkyl groups are methyl, ethyl, propyl, isopropyl, butyl, isobutyl, t-butyl, pentyl, hexyl, cyclohexyl, heptyl, octyl, t-octyl, nonyl, t-nonyl, decyl, undecyl, dodecyl, t-dodecyl, hexadecyl, heptadecyl, octadecyl, elcosanyl and homologs of these.

A more preferred presulfiding agent is a blend of dimethyl sulfide with a dialkyl polysulfide which is one or more of the compounds selected from the group of dimethyl disulfide, dimethyl polysulfide and ditertiary nonyl polysulfide. A most preferred presulfiding agent is a blend of dimethyl disulfide and either dimethyl polysulfide or ditertiary nonyl polysulfide.

The inert solid, porous catalyst support is preferably alumina ($\alpha$-$Al_2O_3$) or silica ($SiO_2$) or a mixture of these materials. However, other solid catalyst supports including clays and carbon may be used.

The oxidic hydrotreating catalyst borne by the support is molybdenum oxide ($MoO_3$) or a combination of $MoO_3$ and cobalt oxide (CoO) where the $MoO_3$ is present in the greater amount. The MoO$_3$ is present on the catalyst support in an amount ranging from about 5 to about 50 percent, preferably from about 10 to 25 percent, based on the combined weight of the support and MoO$_3$. When CoO is present it will be in amounts ranging up to about 20 percent, preferably from about 2 to 10 percent, based on the combined weight of the catalyst support and metal oxides. The oxidic hydrotreating catalyst may be prepared in the plant by depositing aqueous solutions of the metal oxides on the catalyst support material and thoroughly drying or such catalyst may be purchased from various catalyst suppliers.

The liquid illegible line agent of this invention is preferably a low cut, liquid paraffinic hydrocarbon stock, more preferably a naphtha, kerosine or diesel cut having an end boiling point below 750° F. (400° C.). The solvent should contain minimum amounts of sulfur, nitrogen, aromatics and unsaturates.

In the process for preparing the sulfided hydrotreating catalyst, the presulfiding agent and the liquid hydrocarbon solvent are mixed together to form a solution containing at least about 0.5 and up to about 5 percent of sulfur, based on the weight of the solution. This solution is brought into contact with the oxidic hydrotreating catalyst bearing support in the presence of hydrogen. The preferred hydrogen flow rate is at least 50% by volume and more preferably, at least 90% of the maximum once-through hydrogen flow rate of the system. Maximum once-through hydrogen flow rate is determined by the maximum gas capacity of a given process reactor at given temperature and pressure conditions. The catalyst bearing support bed in the process reactor is heated to a temperature in the range of from at least about 350° F. (175° C.) up to about 450° F. (230° C.) and the presulfiding solution is preferably passed through or over the catalyst bed at a liquid hourly space velocity (LHSV) between about 0.5 and 5 hr$^{-1}$ at a pressure preferably ranging between about 200 and 1500 psig (13-102 bars). The presulfiding solution/hydrogen gas feed is continued until the metal oxide catalyst is materially presulfided, i.e., when the catalyst has taken up at least 50 percent of the theoretical amount of sulfur required to effect stoichiometric conversion of the metal oxides (MoO$_3$ and CoO) to their respective reduced sulfides (MoS$_2$ and Co$_9$S$_9$) or until a sharp rise in the effluent concentration of H$_2$S is noted.

Optionally, rather than carrying out the presulfiding at one temperature, the initial presulfiding is carried out as above and, upon completion of the initial presulfiding, the temperature of the bed is raised by at least about 70° F. (25° C.) and the presulfiding solution is passed over the catalyst in the presence of hydrogen until the catalyst is materially presulfided or until a sharp rise in the effluent concentration of B$_2$S is noted.

Thus, the sulfided hydrotreating catalyst of this invention comprises a composition prepared in accordance with the above described process.

After the presulfiding operation is complete, the formed hydrotreating catalyst is used to refine petroleum or other hydrocarbon feedstock by contacting said catalyst with said feedstock in the presence of hydrogen at elevated temperature and pressure. The feedstock is preferably passed through the catalyst at a liquid hourly space velocity (LHSV) of from about 1 to 4 hr$^{-1}$. The temperature of the reaction preferably ranges from 550 to 900° F. (287 to 482° C.) while the pressure is preferably from about 200 to about 2400 psig (13-165 bars).

The following example is set forth to illustrate this invention.

EXAMPLE

Dimethyl Disulfide Presulfiding Agent 91 ml (73 g) of a solid, particulate catalyst bearing molybdenum oxide (MoO$_3$) and cobalt oxide (CoO) was calcined at 850° F. (455° C.) for one hour. This oxidic hydrotreating catalyst, sold by Akzo Chemie as KF-165-1/16, comprised 16 weight % MoO$_3$, 5 weight % CoO and a remainder of alumina ($\alpha$-Al$_2$O$_3$) as the support. The catalyst was diluted by mixing with an equal volume of alumina and the mass charged into a 200 ml. trickle-bed reactor (elongated catalyst-packed tube). The reactor was purged with nitrogen and heated to 450° F. (230° C.) in a molten solder bath. To 7460 g of a diesel oil [APT gravity=37.7°; total sulfur=0.24%; total nitrogen=84 ppm; distillation range=398°-672° F. (203°-355° C.)] was added 110 g of dimethyl disulfide (DMDS) to give a solution containing 1.0 wt % sulfur contributed by the presulfiding agent and a total sulfur content of 1.2 wt %. After a hydrogen flow rate of 2 SCFH at 500 psig (34 bars) total pressure was established, the presulfiding solution was fed at a rate of 206 g/hour (LHSV=2.7 hr$^{-1}$) for twelve hours, exposing the catalyst to a total of 30 g of sulfur. The bath temperature was held at 450° F. (230° C.) for four hours, raised to 600° F. (315° C.) at 25° F. (14° C.)/hour over a six hour period and held at 600° F. (315° C.) for two hours to thereby produce a hydrotreating catalyst.

The bath temperature was then raised to 640° F. (338° C.) over a two hour period while the feed was switched from the presulfiding solution to a vacuum gas oil [APL gravity=22.5°; total sulfur=1.37%; total nitrogen=822 ppm; distillation range=518°-975° F. (270°-524° C.)]. The feedstock LHSV was 2.5 hr$^{-1}$ and the flow was maintained for 72 hours, with liquid product samples being taken every 24 hours.

The average sulfur analysis of the samples was 0.779 wt % and the hydrosulfurizationn rate constant, k, was calculated using the following relationship:

$$k = (LHSV) \times \frac{1}{n-1} \left[ \frac{1}{S^{n-1}} - \frac{1}{S_o^{n-1}} \right]$$

where LHSV is the feedstock liquid hourly space velocity, n is the catalyst HDS (hydrodesulfurization) reaction order (n=1.65 for the above identified MoO$_3$, CoO, alumina hydrotreating catalyst), S is the average weight % sulfur in the product samples and S$_o$ is the weight % sulfur in the feedstock. The calculated k for the above run was 1.41 and this value was used as the basis for calculating the relative volume activities (RVA's) of catalysts sulfided with test sulfiding agents.

A sample of the spent catalyst was taken, extracted with toluene and analyzed for total carbon, hydrogen and sulfur, and the pore volume and surface area were determined by mercury perfusion at 60,000 psi (4880 bars). The results are shown in Table 1 below.

Dimethyl Polysulfide Presulfiding Agent

The above procedure was followed except that pure dimethyl polysulfide (DMPS) containing 76 weight % total sulfur was used in place of DMDS as the presulfiding agent. 110 g of DMPS was blended with 7490 g of diesel oil to give a solution containing 1.0 wt % sulfur contributed by the DMPS. The RVA (relative volume activity) of the catalyst was calculated using the formula:

$$RVA_T = (k_T/k_R) \times 100$$

where $RVA_T$ is the RVA of a catalyst sulfided with test agent T, $K_T$ is the HDS-rate constant for a catalyst sulfided with test agent T calculated as described above for K, and $k_R$ is the HDS-rate constant for a catalyst sulfided with DMDS, calculated above to be 1.41.

The results, including spent catalyst analysis, for duplicate runs where DMPS was used as the sulfiding agent, are given in Table 1 below. The average RVA of 140 is significantly greater than that for DMDS.

DMDS/DMPS Blend Presulfiding Agent

The procedure shown for DMDS above was repeated except that a 1:1 weight blend of DMDS and DMPS was used as the presulfiding agent and 55 g of the 1:1 blend was dissolved in 3905 g of diesel oil to give a solution containing 1.0 wt % sulfur contributed by the blend. The results are given in Table 1 below.

TABLE 1

| Presulfiding Agent | RVA (HDS) | Spent Catalyst Analysis | | | | |
|---|---|---|---|---|---|---|
| | | % C | % H | % S | Pore Volume (ml./g.) | Surface Area $M^2/g$ |
| Catalyst Prior to Sulfurization | — | — | — | — | 0.52[1] | 268[1] |
| DMDS | 100[2] | 8.19[3] | 1.32 | 5.32 | 0.27 | 215 |
| DMPS | 143 } 140[4] | 10.56[5] | 1.79 | 5.51 | 0.2 | 196 |
| DMPS | 137 | — | — | — | — | — |
| DMDS/DMPS Blend | 155 | 9.07[3] | 1.55 | 5.39 | 0.33 | 287 |

[1]Actual lot analysis - manufacturer's data
[2]By definition
[3]Single sample
[4]Average of duplicate runs
[5]Average of analyses of duplicate samples As can be seen from the above table, the RVA of 155 for the blend of DMDS and DMPS is significantly greater than that observed of DMDS and DMPS and such RVA is also significantly greater than that expected on the basis of the individual RVA values for DMDS and DMPS.

I claim:

1. A presulfiding agent comprising a blend of from at least 10 to about 90 weight percent dialkyl sulfide of the formula $R_1S_xR_2$ wherein $R_1$ and $R_2$ are independently alkyl groups having from 1 to 12 carbon atoms and x is 1 or 2, and from no more than 90 to about 10 weight percent of a dialkyl polysulfide of the formula $R_3S_yR_4$ wherein $R_3$ and $R_4$ are independently alkyl groups having from 1 to 20 carbon atoms and y is 2 to 8, provided that the total number of carbon atoms in $R_3$ and $R_4$ do not exceed 30 and y is greater than x.

2. The presulfiding agent of claim 1 wherein said dialkyl sulfide is present in the blend in an amount ranging from 25 to 75 weight percent and said dialkyl polysulfide is present in the blend in an amount ranging from 75 to 25 weight percent.

3. The presulfiding agent of claim 2 wherein said dialkyl sulfide has from 1 to 6 carbon atoms in each alkyl group and said dialkyl polysulfide has from 1 to 9 carbon atoms in each alkyl group.

4. The presulfiding agent of claim 1 dissolved or dispersed in a liquid hydrocarbon carrier therefor.

5. The presulfiding agent of claim 1 wherein x is 2.

6. The presulfiding agent of claim 5 wherein said dialkyl sulfide has from 1 to 6 carbon atoms in each alkyl group and said dialkyl polysulfide has from 1 to 9 carbon atoms in each alkyl group.

7. The presulfiding agent of claim 5 wherein said dialkyl sulfide is present in the blend in an amount ranging from 25 to 75 weight percent and said dialkyl polysulfide is present in the blend in an amount ranging from 75 to 25 weight percent.

8. The presulfiding agent of claim 6 wherein said dialkyl sulfide is dimethyl disulfide and said dialkyl polysulfide, is dimethyl polysulfide or di-t-nonyl polysulfide.

9. A process of presulfiding an oxidic hydrotreating catalyst to form a sulfided hydrotreating catalyst which comprises passing at an elevated temperature and pressure a presulfiding solution and hydrogen gas in contact with an inert solid, porous catalyst support bearing molybdenum oxide in an amount ranging from about 5 to about 50 percent and cobalt oxide in an amount ranging from 0 to 20 percent, said amounts based on the combined weight of the support and oxides, said presulfiding solution comprising a liquid hydrocarbon solvent containing the presulfiding agent of claim 1 in an amount sufficient to provide a total sulfur content of from about 0.5 to about 5 percent based on the weight of said solution, the contact of said presulfiding agent and hydrogen with the catalyst bearing support continuing for a time sufficient to materially presulfide said metal oxides.

10. The process of claim 9 wherein said presulfiding agent is the agent of claim 3.

11. The process of claim 10 wherein the molybdenum oxide is present in an amount of from 10 to 25 percent and said cobalt oxide is present in an amount of from 2 to 20 percent.

12. The process of claim 11 wherein the presulfiding solution is passed in contact with said catalyst bearing support at a liquid hourly space velocity of between about 0.5 and 5, the hydrogen gas is passed in contact with the support at the rate of about at least 50% by volume of the maximum once-through hydrogen flow rate of the process system, and the pressure in the reaction zone ranges between about 200 and 1500 psig (13–102 bars).

13. A sulfided hydrotreating catalyst prepared in accordance with the process of claim 9.

14. The process of claim 9 wherein the presulfiding agent is the agent of claim 5.

15. The process of claim 14 wherein the presulfiding agent is the agent of claim 6.

16. The process of claim 15 wherein the presulfiding agent is the agent of claim 8.

17. A sulfided hydrotreating catalyst prepared in accordance with the process of claim 14.

18. A sulfided hydrotreating catalyst prepared in accordance with the process of claim 15.

19. A sulfided hydrotreating catalyst prepared in accordance with the process of claim 16.

* * * * *